Figure 1:
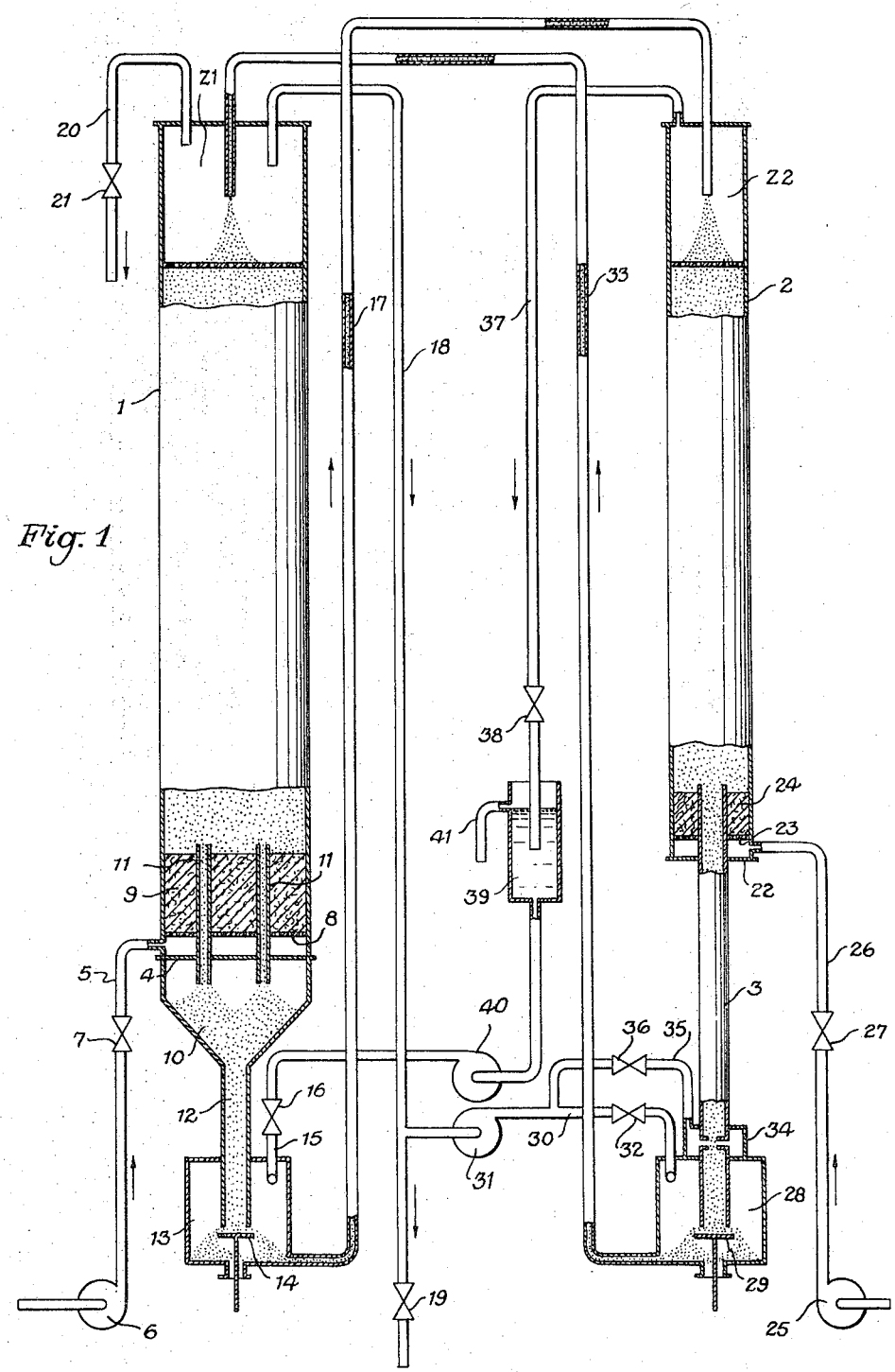

United States Patent

[11] 3,554,376

| [72] | Inventor | Gerhard Kunz |
| | | Gustavsburg, Germany |
| [21] | Appl. No. | 706,107 |
| [22] | Filed | Feb. 16, 1968 |
| [45] | Patented | Jan. 12, 1970 |
| [73] | Assignee | GHH-M.A.N. Technik Gesellschaft fur |
| | | Anlagenbau m.b.H. |
| | | Essen(Ruhr), Germany |
| [32] | Priority | Mar. 1, 1967, Apr. 29, 1967 |
| [33] | | Germany |
| [31] | | M72,968 and M73,793 |

[54] ION EXCHANGE APPARATUS FOR TREATING LIQUIDS
7 Claims, 2 Drawing Figs.

[52] U.S. Cl. ............................................. 210/189
[51] Int. Cl. ............................................. B01j 1/06,
B01j 15/02, C02b 1/72
[50] Field of Search............................................. 211/33,
189, 268

[56] References Cited
UNITED STATES PATENTS

| 2,596,611 | 5/1952 | Weidman et al. | 252/439 |
| 2,671,714 | 3/1954 | McIlhenny et al. | 210/33X |
| 2,801,966 | 8/1957 | Mertes et al. | 210/33 |
| 2,852,464 | 9/1958 | Nordell | 210/33 |
| 2,959,542 | 11/1960 | Pye et al. | 210/189X |
| 2,963,431 | 12/1960 | Dorn et al. | 210/189X |
| 3,003,640 | 10/1961 | Pearce | 210/189 |
| 3,208,934 | 9/1965 | Kingsbury | 210/189X |
| 3,378,339 | 8/1968 | Yamashiki | 210/189X |
| 3,459,306 | 8/1969 | Kanamori et al. | 210/189 |

FOREIGN PATENTS

| 1,025,386 | 3/1958 | Germany | 210/33 |

Primary Examiner—Reuben Friedman
Assistant Examiner—C. M. Ditlow
Attorney—Stephens, Huettig & O'Connell ABSTRACT: In an ion exchange apparatus such as for the softening or desalting of water, the active column and the combined regenerating and washing columns are interconnected by pipe systems including counterpressure chambers so that spent ion exchange material is recycled from the active column through the regenerating and washing columns and back to the active column with a balanced rate of flow.

PATENTED JAN 12 1971

3,554,376

SHEET 1 OF 2

INVENTOR

Gerhard Kunz

BY Stephens, Huettig and O'Connell
ATTORNEYS

INVENTOR
Gerhard Kunz

ION EXCHANGE APPARATUS FOR TREATING LIQUIDS

This invention related to an apparatus for treating liquids especially for the softening or desalting of water by means of ion exchange material which is continuously moved in counterflow through the apparatus and after being used can be regenerated.

For the softening and complete desalting of water, filters have been used such as solid bed filters containing ion exchange material. These filters have a definite capacity per unit of weight and volume and are charged with the raw water from which the impurities are to be removed. The running time of the filter depends upon its charging capacity which means it is limited by the velocity upon which the raw water flows in one direction through the ion exchange material. It is for this reason that the running time has become the basis for the design of the filter and, in addition to other factors, determines the size of the filter. After the running time is over the ion exchange mass is, as a rule, spent and no longer usable to purify the water. This spent material is flushed back, regenerated by a suitable solution, and then washed in order to be able to be again used in the exchanger. During regeneration, the filter is out of operation. Inasmuch as uninterrupted operation is desirable, a second filter is desirable so that it can be operated while the ion exchange of the first filter is regenerated.

For softening and desalting water, a mixed bed has been used in order that the water is moved in countercurrent flow to the ion exchange material in the active column. The exchange material which has become spent after passing through the active column is then introduced into a regenerating column and regenerated by a solution flowing in counterflow to the exchange material and then it is washed by being put in counterflow with the cleaning liquid. Then the regenerated and washed material is recycled to the active column for use. The exchange material which is composed of anions and cations moves continuously in a cycle through the apparatus, and following the previous separation of the anion and cation portions, these portions are reactivated in separate washing and regenerating columns before being again used. In these methods, it has been considered a disadvantage that the use of the mixed bed in the active column does not permit a sufficient exchange activity so that the amount of softening and/or desalting of the water is not as much as expected.

Also, during the softening of water, the reactivating of the spent material has been divided into several column steps, the first of which is used for regeneration, the second for adding salt, the third for regenerating the exchange material, the fourth for admixing the acid and/or solvent agent, and finally, the fifth for washing the ion exchange material. The reactivated exchange material having passed through all these steps is put in an overhead vessel into which the raw water is introduced through the bottom in countercurrent flow to the exchange material. The treated water is withdrawn from the top of the vessel and the exchange material from the bottom of the vessel. The spent material removed from the bottom of the vessel is fed to the top of a regenerating column and removed from the bottom of the regenerating column in order to be again introduced into the active column. Although this method can be continuous, it is not possible to accomplish an optimum softening of the water in the active column because the dwell time in the water in the same layer of exchange material above the filter bed is too short and the mixing of the raw water with the exchange material is not complete.

The object of this invention is to produce an apparatus for the continuous operation of the ion exchanger in which the ion exchange material is in counterflow to the raw water and the spent exchange material, after being regenerated, can produce a high degree of softening or desalting of the raw water in the active column at a small cost and with efficient use of the exchange material.

This object is obtained in that the exchange material used in one or more portions of the active column is regeneratable in a regenerating column in one or more steps and washable in a washing column in one or more steps. The spent material is removed from the active column to a counterpressure chamber and led through a closed pipe system to the regenerating column through which it passes in counterflow with the regenerating liquid. Then the regenerated material flows through the washing column in countercurrent flow with the washing liquid and then returned through a pressure chamber and pipe system to the active column. A liquid in the latter counterpressure chamber is taken from the clean water coming from the active column to control the amount of regenerated material recycled to the active column. The liquid is introduced tangentially into its respective counterpressure chamber and after leaving the chamber is used for transporting the ion exchange material in the pipe system. A valve is inserted in the pipe line connecting the pressure chamber for the active column to the regenerating column for throttling the rate of flow between these columns. When the valve is closed. This valve permits the adjustment of equal amounts of volume of flow per unit of time in both pipe systems. Other valves installed in the raw water supply line and in the drainage line permit the pressure in the active column to be held at a constant level.

According to a further feature of this invention, columns are used for effecting the method, namely, an active column, a regenerating column, and a washing column. They are made as long narrow slender tubes having one or more intermediate bottoms separating the various steps in the columns. The bottoms have openings for the rising liquid and overflow pipes for the downward moving of the ion exchange material. Where several intermediate bottoms are used, the length of each overflow pipe is such that this pipe extends from approximately one intermediate bottom to approximately the next but one intermediate bottom, while when only one intermediate bottom is used the overflow pipe is submerged approximately for the same distance as in the chambers formed by the intermediate bottoms. A drain pipe is connected to the bottom of the active column and used for the passage of the spent exchange material from the active column to a counterpressure chamber. A valve is provided for closing the drain pipe. The washing column has a valve for closing the column so that material cannot enter the washing counterpressure chamber. Above the washing counterpressure chamber is an annular chamber surrounding the washing column and which has nozzles for directing washing liquid into the washing column.

This invention has the following advantages.

If a mass of ion exchange material having ions A is contacted by a solution having ions B, then an exchange of their ion types takes place between the solution and the exchange material, in case the system is not operating in balance. The velocity of the adjustment speed for the balance is given by the diffusion resistance in which the most important are the film diffusion resistance and the granular matter diffusion resistance. In exchange reactions, such as in the softening of water, the film diffusion resistance portion is very high. In most cases, it is the factor which determines the velocity. It has not been found that, when the solution flows from the bottom upwardly through the exchange material, the velocity of the balance adjustment speed is increased considerably as compared to the solid or liquid bed when the linear velocity of the solution is selected high enough to form a fluid bed. When the fluid bed is activated from the bottom toward the top, then a drop in concentration arises on the longitudinal bed axis. This concentration extends from between the active exchange material balance and the regenerated exchange material balance. The distance of this zone is entitled the "reaction height." Therefore, below this zone, there is no exchange. It has been found that, even with an extreme expansion of the fluid bed, the zone is sharply defined when slender columns are used.

It has been found that, on one hand, the reaction height becomes greater with an increase of the linear velocity of the solution but that, on the other hand, and because of the much higher rate of exchange in the fluid bed, it remains less than in a corresponding solid bed. If a fluid bed is activated as described, then the reaction zone wanders along the longitudinal axis from the bottom toward the top. If, over the top of the active column, such a large amount of regenerated and washed exchange material is introduced so that the capacity which is reached at the bottom of the active column corresponds to the ion content of the solution and the solution volume and if the same amount of material per unit of time is removed from the bottom of the active column, then a stationary concentration state is reached in the fluid bed. It has been especially found that the exchange material is used to its maximum degree when the height of the fluid bed of exchange material is equal to the reaction height.

These factors apply both for the active column as well as for the regenerating column.

The regenerated exchange material must be freed from the regenerating liquid which has been partially absorbed and clings to it. In this invention, this liquid is removed by counterflowing the washing liquid in a washing column from the bottom to the top with the regenerated material moving downwardly. It has been found that this washing is accomplished more rapidly in a fluid bed than in a solid bed. Also, the washing height is analogous to the reaction height. It has been especially found that the mass of exchange material can be optimumly treated with the smallest amount possible of washing liquid when the fluid bed height of exchange material is equal to the washing height. Because of this, the washing column can be made smaller than the regenerating column.

The performance of the counterflow method in which the regenerated and washed exchange material is transferred into the active exchange area and the spent exchange material is transferred to the regeneration area takes place in columns having special drainage systems and devices for handling the exchange material. These columns and drainage systems are connected by pipes so that an extremely simple control for the entire apparatus is possible. A special feature is in that with this control the transfer of the exchange material to the active column and the transfer of spent exchange material to the regenerating column can be hydrodynamically coupled. This, in turn, makes possible the control of the transfer of both types of material by means of only a single valve. Also, by means of this, the pumps for the through transfer of the exchange material are eliminated.

Three columns are needed for the fluid bed counterflow ion exchange method of this invention. One column is for the active ion exchange material, one for the regeneration and one for the washing. The regeneration and washing columns are advantageously combined to a single column unit in which the washing column is below the regeneration column. Adjacent the bottom of the active column is a raw water distribution system and a drainage system including a counterpressure chamber for receiving the spent exchange material. Adjacent the bottom of the regenerating column is a regenerating fluid distribution system which extends around the washing column. Washing water is supplied through nozzle means at the lower portion of the washing column and the washing column ends in a counterpressure chamber.

A pipe connects the washing column counterpressure chamber with the head of the active column. Another pipe extends from the active column counterpressure chamber to the head of the regenerating column. The active column counterpressure chamber is joined by a pipe to the regenerating column for the flow of used regenerated liquid and the washing column counterpressure chamber is joined by a pipe to the clear water discharge line of the active column. A drain line for the clear water extends from the head of the active column and another drain line extends from the head of the regenerating column for draining the used regenerating fluid and which ends in an overflow vessel.

A pipe extends from this overflow vessel through an auxiliary pump to the active column counterpressure chamber. The raw water flows through the distributing system adjacent the bottom of the active column and then flows upwardly from the bottom to the top of the active column and leaves this column through the drain line for the clear liquid. This upward flow through the active column is at such a velocity that the amount of exchange material in the column forms a fluid bed largely expanded and highly turbulent. While the spent exchange material drops down into the active column counterpressure chamber, an equally large amount of fresh active exchange material is introduced into the head of the column. It is in this way that the fluid bed moves in counterflow to the liquid from the top toward the bottom.

The free removal of the spent exchange material through the active column pressure chamber is controlled by means of the counterpressure liquid which is supplied through the counterpressure pipe. A counterpressure liquid forces the spent exchange material through a pipe to the head of the regenerating column.

The regenerating liquid flows from the bottom to the top of the regenerating column and leaves this column through the drainage pipe. The diameter of the regenerating column is selected so that the liquid has a high velocity so that the exchange material in the column is formed into a largely expanded fluid bed with high turbulence. As the regenerated exchange material moves through the washing column, the spent material is being introduced into the head of the regenerating column. This creates a fluid bed moved in counterflow of the regenerating fluid from the top toward the bottom. The regenerated material drops into the washing column. Clear liquid is introduced into the lower portion of the washing column, which liquid flows through the washing column from the bottom to the top. The diameter of the washing column is so small that the high velocity of the washing liquid forms a fluid bed with the regenerated exchange material. The washed exchange material drops from the washing column into the washing column counterpressure chamber so that the fluid bed in the washing column moves in counterflow to the washing water from the top toward the bottom. The washing water rising at the top of the washing column and containing washed-out regenerating fluid is combined in the regenerating column with fresh regenerating liquid.

The flow of the regenerated and washed exchange material from the washing column into the counterpressure chamber is retarded by counterpressure liquid coming from the clear liquid being removed from the active column. The pressure in the chamber is such that a portion of the counterpressure liquid can control the rate of flow of the washed exchange material from the washing column into the chamber. The counterpressure liquid also forces the regenerated and washed exchange material through the pipe extending to the head of the active column.

The liquid which moves the spent material from the active column to the top of the regenerating column is mixed with the used brine rising in the regenerating column and the mixed liquids then flow into the overflow vessel. A part of the liquid in the overflow vessel is then sent to the active column counterpressure chamber so that the liquid is recycled. The excess of the used brine is removed from the vessel by an overflow drain.

For the efficient function of the method, it is essentially significant that not only sufficient but, above all, equal amounts of regenerated and activated amounts of exchange material are transferred into the corresponding columns. Furthermore, the use of conveyor pumps for the transfer of the exchange material is eliminated. The function of the counterpressure chambers for the transfer and control of the exchange material is as follows. A higher pressure is adjusted in each counterpressure chamber by means of the counterpressure liquid than exists at the head of the regenerating column and the active column. The result is a pressure difference between the lower and upper ends of the transfer pipes, which difference in pressure permits the counterpressure liquid to flow as a transfer liquid through the respective transfer pipe systems. Corresponding to the pressure of the counterpressure liquid in the counterpressure chamber, the outlet velocity of the exchange material is more or less retarded. The control is by means of the valve in the drain pipe for the used brine. This pipe also contains the transfer liquid to be used for the transfer of spent material after it has been separated from the active column. When this valve is throttled, then the pressure rises in the regenerating column and also the pressure in the counterpressure chamber of the active column. Consequently, a less amount of spent exchange material enters the active column counterpressure chamber. On the other hand, because of this throttling, the pressure has risen in the regenerating and washing columns which means that less washing water can enter the washing column. However, more washed exchange material in the washing column counterpressure chamber can flow into this counterpressure chamber. At the same time, the transferring flow for the washed exchange material increases by the amount of the throttle pressure of the counterpressure liquid. Of course, when the valve is opened, then the procedure is reversed. The amount of transported exchange material increases and the amount of transferred washed exchange material decreases. Thus, it is possible to control the circulation of the exchange material throughout the entire apparatus by the actuation of a single valve which essentially simplifies the entire process.

In view of the above, it was possible to determine further additional advantages this invention has for a series of exchange material processes.

It has been determined that the reaction zone height for the fluid bed in this exchange process depends especially on the remixing degree of the granular mass of the exchange material as well as upon the turbulence, grain size, separation factor and so forth. The remixing degree is kept low when a slender column-type apparatus is used, as already mentioned. However, there are other known ion exchange systems whose separation factor is so low that it results in a large reaction height with an extremely high requirement for cleaning the product. Corresponding factors are determinable even for the partial processes of regeneration and washing.

It has now been found that the remixing degree and thus the reaction height and/or the washing height can be considerably lower when the remixing of the exchange material grains is interrupted by the use of intermediate bottoms. These bottoms have openings for the through-flow of the liquid an and which are provided with, in a known manner, either filter nozzles or movable closure means such as valve plates, especially for liquids carrying suspended matter. Overflow pipes are mounted in each intermediate bottom through which the exchange material can get from one bottom to the next bottom.

The process for the active separation, regenerating and washing is completely continuous and not interrupted by any periodically arising type of work. Because of the special hydrodynamical coupling of both transportion systems, the control of the apparatus is very simple and requires little expenditure for moving parts such as for pumps and pipe lines and has low operational costs. Slender columns are used for the active separation, regeneration and washing which guarantee a narrow reaction zone and thus achieve the quality production of the solid filters. Even in ion exchange systems having a large reaction height, it is possible to achieve product quality by using the intermediate bottoms which is often better than that of solid filters.

So-called standing time for fresh active and spent masses of exchange material is eliminated because the height of the fluid bed in the active column is equal to the active reaction height, the height of the fluid bed in the regenerating column is equal to the reaction height during regeneration and the height of the fluid bed in the washing column is equal to the washing height. Thus a considerable saving is obtained for the mass of exchange material necessary. A fluid bed for the washing column needs only a minimum amount of washing liquid which becomes only slightly diluted by the reaction liquid. Consequently, the regenerating liquid can be prepared with raw liquid which means a saving in clear or cleaned liquid.

Because of the violent swirl in the fluid beds of the active and regeneration column of this invention, it has been found that a strong turbulence causes a much higher speed of ion exchange than is possible in comparable solid or stationary filters, which means a reduction of the mass of exchange material and thus a considerable reduction in investment costs.

Figure 2:
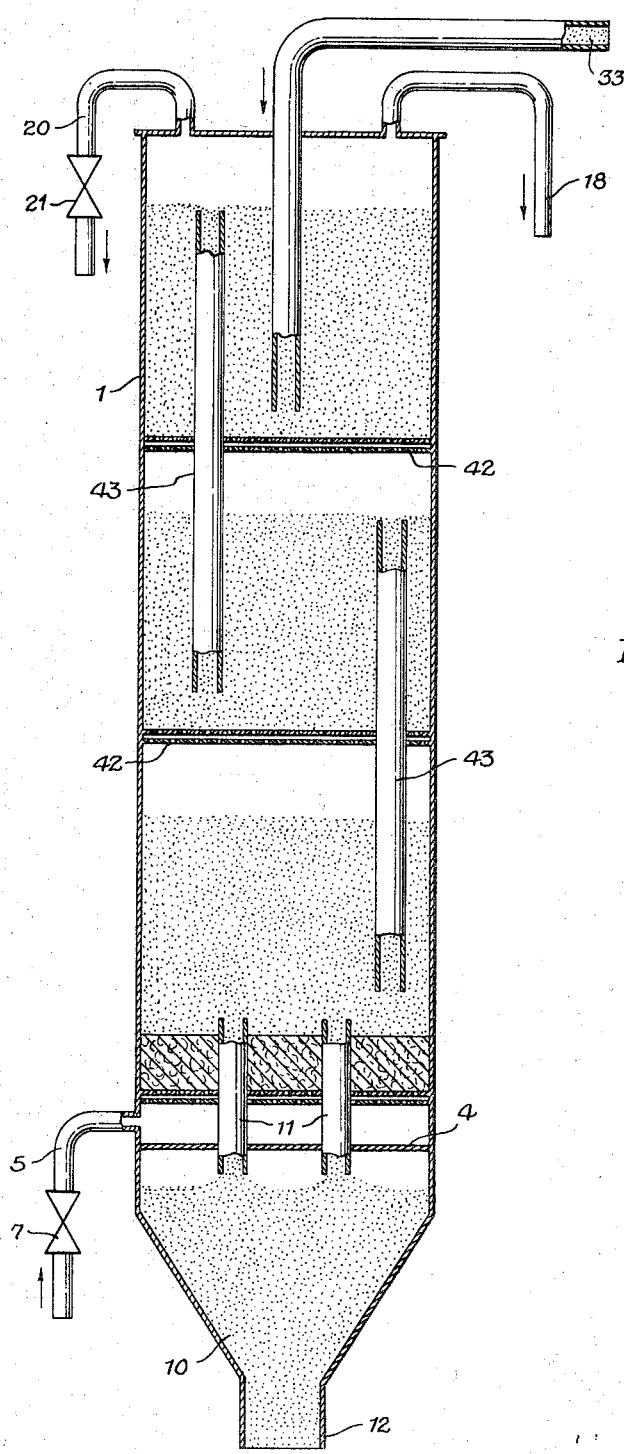

The means by which the objects of the invention are obtained are described more fully with reference to the accompanying drawings in which:

FIG. 1 is a cross-sectional view through the apparatus of this invention including active, regenerating and washing columns with the pipe systems connecting the columns; and FIG. 2 is a cross-sectional view of an active column having intermediate bottoms and overflow pipes.

The invention essentially requires three slender columns which are the active column 1, the regenerating column 2 and the washing column 3 for washing the exchange material. A tightly sealed intermediate bottom 4 is located adjacent the bottom of column 1. Above bottom 4 is a space into which the pipe 5 enters for the introduction of raw water. This raw water comes from pump 6 and passes through control valve 7. A perforated distributing bottom is mounted above intermediate bottom 4 to form a space for the introduction of the raw water, the perforations constituting nozzles for the passage of the raw water. Supported on pilate 8 are layers of filler bodies 9 which further distribute the raw water. Below intermediate bottom 4 is a conical drainage funnel 10 for the collection of spent exchange material. This funnel 10 communicates with the interior of column 1 by means of drainage pipes 11 which extend into the fluid bed in column 1. Funnel 10 is connected to drain pipe 12 which extends into the active column counterpressure chamber 13. The lower end of pipe 12 is engageable with an adjustable plate valve 14. A counterpressure liquid pipe 15 extends from within chamber 13 through valve 16 to auxiliary pump 40. The portion of pipe 15 within chamber 13 is curved so that the counterpressure liquid is injected tangentially into chamber 13. The amount of injected liquid is adjusted by valve 16. From chamber 13, a transfer pipe 17 extends through the top or head of regenerating column 2 to a length of about 5 percent of the regenerating column. This creates a quiet zone Z2 which prevents the loss or removal of exchange material. A cleaned or clear water line 18 extends from the top or head of active column 1 which is closable by a valve 19. A slime drainage line 20 extends through the top of column 1 a distance of about 2.5 percent of the height of column 1 and contains a closable valve 21.

Washing column 3 of less diameter than regenerating column 2 projects through the bottom 22 of the regenerating column 2. This feature prevents the regenerating liquid from breaking into the washing column 3. Above the space provided for the entry of the regenerating liquid, such as salt brine, is a perforated distributing bottom 23, with the perforations acting as nozzles which supports filler body layers 24 for the further distribution of the regenerating liquid. The filler bodies are as high as the upper edge of the washing column 3. The regenerating liquid is supplied through pump 25 and pipe 26 containing adjusting valve 27. The lower portion of column 3 extends into washing column counterpressure chamber 28. The lower end of column 3 can be opened or closed by adjustable valve plate 29. Clear liquid is used as the counterpressure liquid and forced through pipe 30 into chamber 28 by means of an auxiliary pump 31, the clear liquid coming from pipe 18. The end of pipe 30 is curved so that the counterpressure liquid is tangentially introduced into chamber 28. The amount of introduced liquid is controlled by valve 32. A transfer pipe 33 tightly connected to chamber 28 leads through the top cover of column 1 and extends into this column a distance of about five percent of the length of column 1. This creates a quiet zone Z1 which prevents the removal of exchange material. Above counterpressure chamber 28 is an annular chamber 34 from which washing liquid can enter washing column 3 by means of nozzles, not shown. This washing liquid comes through pipe 35 which is connected to the pressure side of pump 31. The amount of liquid flowing through pipe 35 is controlled by valve 36. A drain pipe 37 extends from the top of column 2 for the removal of the used regenerating liquid and contains a control valve 38. Pipe 37 extends into an open vessel 39 to which an overflow pipe 41 is connected for the removal of the excess used regenerating liquid and/or brine. A further pipe connects vessel 39 to pump 40 for the supply of counterpressure liquid through line 15 into counterpressure chamber 13.

FIG. 2 shows the use of the intermediate bottoms 42 in the active column 1. One or more overflow pipes 43 are attached to and extend through each intermediate bottom 42. Each overflow pipe above its intermediate bottom has a length which is equal to the height of the fluidized bed above that bottom. Its length below its intermediate bottom 42 is such that it extends into the fluidized bed or the intermediate bottom beneath it. The distance from the upper end of pipe 43 to the next above bottom 42 may not be less than the depth of the fluidized bed of ion exchange material the pressure loss through which, under given conditions of flow, is equal to the pressure loss through this intermediate bottom 42. It has been found that the starting up of the apparatus with an uninterrupted and undisturbed counterflow transfer of the exchange material is only possible under these conditions. The transfer line 33 in this case extends tightly sealed through the cover on top of column 1 until just above the uppermost intermediate bottom 42.

The operation of this invention is as follows.

The raw water to be cleaned is forced by pump 6 through pipe 5. The amount of raw water is adjusted by valve 7. The raw water is uniformly distributed into column 1 by means of the distributor bottom 8 and the filler bodies 9.

The ion exchange material in column 1 is formed by the velocity of the raw water into a sharply defined fluid bed. The water is softened in this fluid bed. The clean water leaves active column 1 through the clear water line 18 and through valve 19. A low excess pressure is given the column 1 by means of valve 19. The spent exchange material flows through drain pipes 11 and drain pipe 12 into the counterpressure chamber 13. The adjustable valve 14 is open during this step. The flow of the counterpressure liquid is adjusted by valve 16 in pipe 15. This counterpressure liquid hinders the free drainage of the spent exchange material and transfers the spent exchange material through pipe 17 to the head of regenerating column 2. The regenerating liquid and/or regenerating brine is forced by pump 25 through pipe 26. The amount of flow is regulated by valve 27. The regenerating liquid and/or brine is introduced in the space beneath distributor bottom 23 and by flowing through this bottom and filler bodies 24 is uniformly distributed into regenerating column 2. The exchange material in column 2 is formed into a sharply defined fluid bed by the flow of regenerating liquid. The spent exchange material is regenerated in this fluid bed. The used regenerating liquid together with the liquid coming from pipe 17 into column 2 is removed from column 2 by drain pipe 37 and flows through valve 38 into open vessel 39. A portion of the used regenerating liquid, such as brine, passes through auxiliary pump 40 through counterpressure pipe 15 and valve 16 as counterpressure liquid into chamber 13 of active column 1. The excess used regenerating liquid and/or brine leaves this circulatory liquid transport system through the overflow pipe 41.

The regenerated exchange material flows from column 2 through washing column 3 into counterpressure chamber 28. Valve 29 is open during this step. The rinsing water flows through valve 36 in pipe 35 into annular chamber 34 surrounding column 3. The amount of washing water, that is the washing liquid is metered in such a way that a fluid bed is formed in column 3. The regenerated exchange material is washed free from brine in this fluid bed. The flow of counterpressure liquid in counterpressure pipe 30 is adjusted by valve 32. A portion of this counterpressure liquid enters washing column 3 and thereby hinders the discharge of the washed exchange material. The other portion, together with the drained regenerated washed mass of exchange material flows through transfer pipe 33 to the head of the active column 1. The transferring liquid is taken off together with the clear water through pipe 18. The wash water for annular chamber 34 as well as for the water pressure liquid for chamber 28 is taken from clear water pipe 18 into the suction side of pump 31.

The pressure in regenerating column 2 is adjusted by valve 38 so that a transfer takes place both through pipes 17 and 33. The coarse adjustment of the amount of exchange material moved per unit of time is accomplished by means of valves 14 and 29. In the practical operation of the apparatus, it is of essential significance that the same amount of transferred spent and regenerated exchange material is accomplished very simply. This is by means of the valve 38. If, for example, the amount of spent exchange material passing through pipe 17 is more than that of the regenerated exchange material flowing thru through pipe 33, the valve 38 is slightly closed. The pressure during this operation rises in column 2 and more exchange material flows into counterpressure chamber 28 which results in that the amount of material flowing through line 33 is increased. At the same time, the pressure in pipe 17 also rises and increases the extent to which the flow of spent exchange material flows into counterpressure chamber 13. Thus the amount of material being transferred in pipe 17 is decreased. When valve 38 is opened, a correspondingly opposite procedure, of course, results.

After a long period of operation, the dirt from the raw water collects in the quiet zone Z1 of the active column 1. It is removed from time to time through the slime drain pipe 20 and valve 21.

The same procedure for producing sweet water from sea water corresponds to the above-described method for the softening of water. The same procedural steps take place in each instance.

I claim:

1. Apparatus for continuous water softening and/or demineralizing cycle comprising an active column connected downstream to a regenerating column and a washing column in which the individual columns are formed as long slender pipes and connected hydraulically to each other through inlet and outlet pipes which are continuously kept open during the operation of the cycle, an inlet pipe for the raw water being at the bottom end of the active column, a clear water line for the treated water and a transfer pipe for the ion exchange resin and a drainage line being at the top of the active column, and in which a drainage funnel is connected to the bottom of the active column and a drain pipe for spent ion exchange resin that is being withdrawn from the active column is connected to the drainage funnel and enters into a back-pressure chamber also at the bottom end of the active column, the back-pressure chamber being connected by a transfer pipe for the spent ion exchange resin to the top end of the regenerating column and, by another pipe for conveying liquid, to a regenerant discharge drain pipe overhead-mounted on the regenerating column, and the inlet end of the washing column entering the regenerating column through a distributor filler body located at the bottom end of the regenerator column while a feed pipe for the regenerant enters below this distributor body, and the washing column being provided at its end opposite to the regenerating column with a back-pressure chamber and an annular chamber, and a pipe for washing liquid connected with the clear water line entering said annular chamber, and another pipe for conveying liquid for washing and subsequent conveyance of the ion exchange resin which is also connected with the clear water line and enters the back-pressure chamber, said back-pressure chamber of the washing column being connected by a transfer pipe for regenerated and washed ion exchange resin to the active column, and a single control element mounted in the regenerant drain pipe for controlling the flow rates of the media to be treated and treated media through the individual columns.

2. Apparatus as in claim 1 in which at least one of the columns is provided with intermediate bottoms which are permeable to water, overflow pipes fitted to said intermediate bottoms to permit the passage of ion exchange resin, said intermediate bottoms dividing the column into several chambers, and said overflow pipes of each intermediate bottom extending from a point close to the bottom above to a point close to the bottom below.

3. Apparatus as in claim 1 in which the opening area of the drain pipe entering the associated back-pressure chamber of the active column and the washing column is adjustable by means of a plate valve.

4. Apparatus as in claim 1 in which pipe enters the back-pressure chamber of the active column or the washing column in a tangential direction.

5. Apparatus as in claim 1 in which said annular chamber surrounds the washing column, and in which an annular nozzle is mounted through which the washing water is emitted.

6. Apparatus as in claim 1 in which said transfer pipe for the regenerated and washed ion exchange resin projects into said active column with a length of about five percent of the height of the active column, and in which said transfer pipe for spent ion exchange resin projects into said regenerating column with a length of about five percent of the height of said regenerating column, and in which said drainage line projects into said active column with a length of about 2.5 percent of the height of said active column.

7. Apparatus as in claim 1 in which an overflow vessel with overflow pipe and a pump are connected between said drain pipe and said pipe entering into the back-pressure chamber of the active column, and in which a pump is interconnected between the pipes entering said washing column and its associated back-pressure chamber, respectively, and the common clear water line.